D. Newhall,
Tree Protector.
Nº 1,846. Patented Oct. 31, 1840.

2 Sheets, Sheet 1.

D. Newhall,
Tree Protector.
No. 1,846.  Patented Oct. 31, 1840.
2 Sheets—Sheet 2.
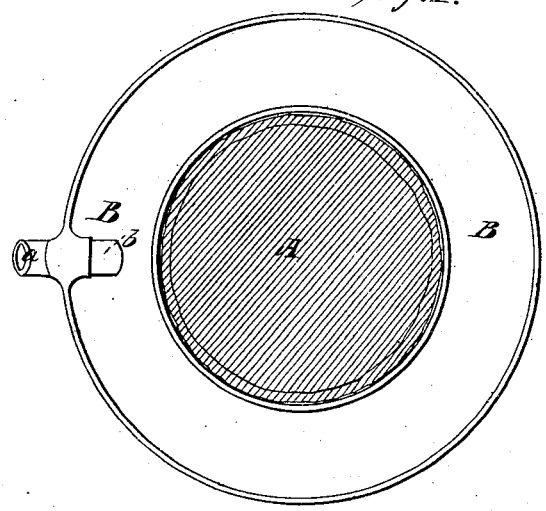
Fig: 1.
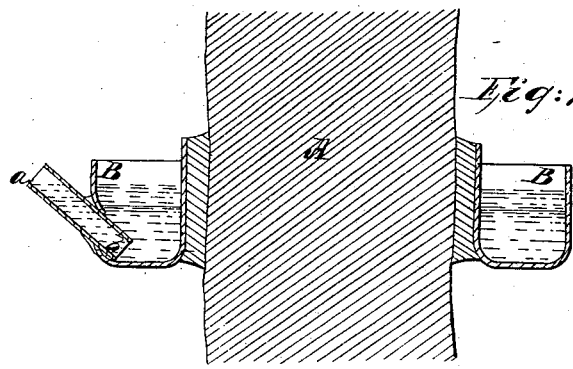
Fig: 2.

UNITED STATES PATENT OFFICE.

DANIEL NEWHALL, OF LYNN, MASSACHUSETTS.

IMPROVEMENT IN THE MODE OF PROTECTING TREES FROM THE CANKER-WORM.

Specification forming part of Letters Patent No. 1,846, dated October 31, 1840.

*To all whom it may concern:*

Be it known that I, DANIEL NEWHALL, of Lynn, in the county of Essex and State of Massachusetts, have invented new and useful Improvements in Machinery for Destroying the Grubs from which the Canker-Worms are Generated, of which the following is a specification.

These improvements, the principles thereof, the application of said principles by which the same may be distinguished from other inventions of a similar nature, together with such parts or combinations as I claim to be my invention, I have herein described and set forth, which description, taken in connection with the accompanying drawings herein referred to, forms my specification.

It has long been the desire of agriculturists to invent or procure some contrivance which shall effectually prevent the ascent of the tree by the " grubs," so called, which deposit their eggs on the branches of trees, from which eggs the canker-worms are generated. It is well known that the grub ascends the tree in the fall and spring, and that the process of incubation, by which the canker worms are formed, is matured early in the spring, so that the worms destroy the foliage and blossoms and prevent the formation of the fruit.

The apparatus now commonly used for destroying the grub consists of a metallic trough or canal which surrounds the trunk of the tree, in which trough oil or any other liquid which is deleterious to the grub, and which will not evaporate, is placed, and in endeavoring to pass through which it is destroyed. The objection to this is that the wind blows out the oil, and the water which falls during rain-storms collects in the troughs and displaces the same, and then evaporating leaves the canal dry, and the ascent of the grub is no longer prevented. The leaves, bark, &c., from the tree, as well as the grubs which have been destroyed, are also liable to collect in the trough and form a bridge, as it were, for the passage of the grub. To remedy these several objections a roof has sometimes been attached to the canal, leaving sufficient space between the trough and the lower edge of the roof for the removal of any leaves, &c., which may enter. The existence of this space renders such an apparatus defective in the same points as those previously mentioned; and to effectually obviate these objections is the purpose of my invention.

Figure 2:
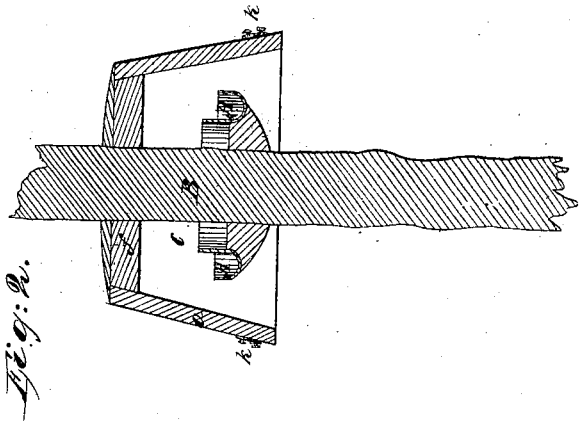
Figure 3:
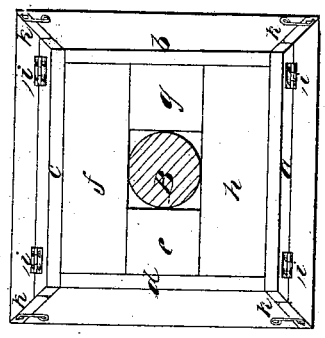
Figure 1:
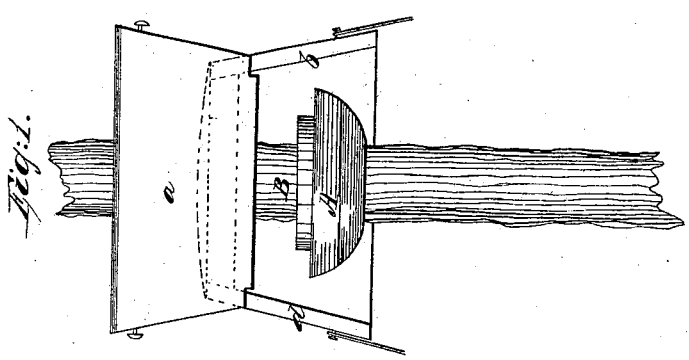

Figures 1, 2, and 3 of the accompanying plate of drawings represent my invention, Fig. 1 being an elevation; Fig. 2, a longitudinal section of the same attached to a tree.

The metallic trough or canal A, in which the oil is placed, when passed around the tree and soldered together, is shaped as seen in Fig. 2, and is somewhat larger in diameter than the trunk of the tree B to allow for the growth of the same, and is secured to the tree by nails or otherwise, the space between the bottom of the trough and the tree being filled with clay or any proper cement, and that between the inside of the canal and tree by blocks or billets of wood, which may be diminished in size as the increase of the trunk requires such diminution.

A roof or casing, $abcd$, which completely incloses the canal, is connected at its top to the trunk of the tree at a point considerably higher than the top of the trough. This roof is connected to the tree by means of a square wooden framework, $efgh$, Fig. 3, the exterior of the same being beveled, so as to cause the sides of the casing to be divergent, as shown in the figures, the spaces between the inside of the frame and the tree being filled with chips or blocks of wood. The top of the roof is covered with cement, over which a coating of tar or pitch is laid, if necessary, the roof having sufficient inclination on the top to cause the rain to pass off. Two of the diverging sides—viz., $a$ and $c$—are constructed in two parts each, which are prepared with suitable hinges, $i\,i\,i\,i$, so that the lower parts may be raised or lowered in order to inspect the canal and remedy any defect therein. These sides, when required, may be fastened down by means of hooks and otherwise, as shown at $k\,k$. It will also be observed that the sides of the casing or roof project downward below the bottom of the canal, so as to effectually protect the same and prevent any rain, leaves, or other substances from falling or getting into the trough, which, as has already been observed, destroys the utility of the apparatus.

It should be particularly noticed that the roof and trough are entirely disconnected and at a considerable distance from each other, which effectually prevents the grub from passing from one to the other, by doing which it would be enabled to ascend the tree.

The material of which the parts of my apparatus are constructed, as well as the form of the same, may be varied to suit the pleasure of the manufacturer.

Having thus described my improvements, I claim as my invention—

A roof or casing constructed substantially as above described—viz., with sides projecting below the bottom of the trough, two of which sides are movable or capable of being raised, in combination with a metallic trough for oil or other liquids suited to the object, the whole being arranged substantially in the manner and for the purposes above set forth.

In testimony that the foregoing is a true description of my said invention and improvement I have hereto set my signature this 22d day of August, 1840.

DANIEL NEWHALL.

Witnesses:
R. H. EDDY,
EZRA LINCOLN, Jr.